United States Patent [19]

Gachot

[11] 4,420,140

[45] Dec. 13, 1983

[54] BUTTERFLY VALVE AND A METHOD OF MANUFACTURE OF SAID VALVE

[76] Inventor: Jean Gachot, 26 bis, avenue de Paris, 95230 Soisy Sous Montmorency, France

[21] Appl. No.: 140,999

[22] Filed: Apr. 17, 1980

[30] Foreign Application Priority Data

May 4, 1979 [FR] France .................. 79 11275

[51] Int. Cl.³ .......................... F16K 1/22; B23P 15/00
[52] U.S. Cl. ..................................... 25/152; 251/307; 251/308; 251/367; 29/157.1 R
[58] Field of Search ............... 251/305, 306, 307, 308, 251/148, 151, 152, 367; 29/157.1 R, 417, 558

[56] References Cited

U.S. PATENT DOCUMENTS

| 2,309,666 | 2/1943 | Parker ........................... 29/157.1 R |
| 3,591,133 | 7/1971 | Miles et al. ..................... 251/308 X |
| 3,705,707 | 12/1972 | Scaramucci ..................... 251/152 X |
| 3,997,142 | 12/1976 | Broadway ......................... 251/307 |
| 4,038,734 | 8/1977 | Goldman ......................... 251/305 X |
| 4,055,323 | 10/1977 | Gachot .............................. 251/306 |
| 4,254,937 | 3/1981 | Hubertson ......................... 251/305 |

FOREIGN PATENT DOCUMENTS

| 2452034 | 5/1976 | Fed. Rep. of Germany . |
| 1327181 | 11/1963 | France . |
| 2454032 | 11/1980 | France . |

Primary Examiner—A. Michael Chambers
Attorney, Agent, or Firm—Young & Thompson

[57] ABSTRACT

The butterfly valve comprises a valve body traversed by a passageway and a closure element or butterfly valve disk placed transversely with respect to the passageway. An annular bearing surface of the valve disk is intended to bear on a valve seat placed within the passageway. The valve body is constituted by an annular member provided with a chimney in which an operating shaft is mounted. The annular member is supported in leak-tight manner by a bearing ring having a greater thickness in the radial direction than the wall of the annular member. The bearing ring is inserted between the two end portions of the piping system and forms part of the valve body under operational conditions.

8 Claims, 8 Drawing Figures

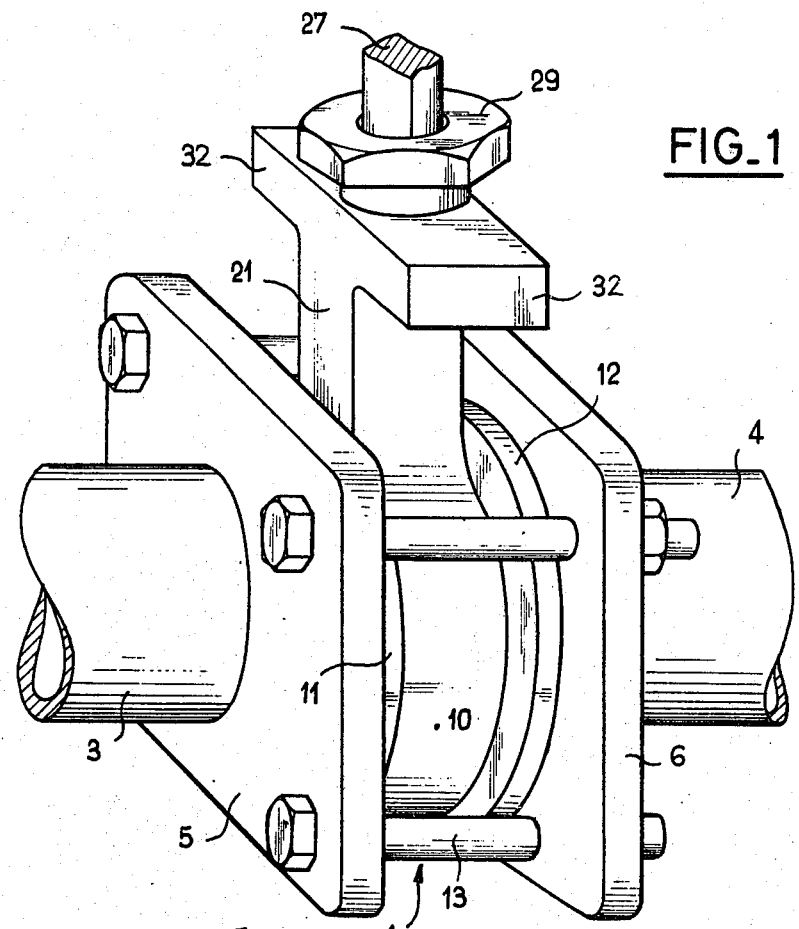
FIG_1
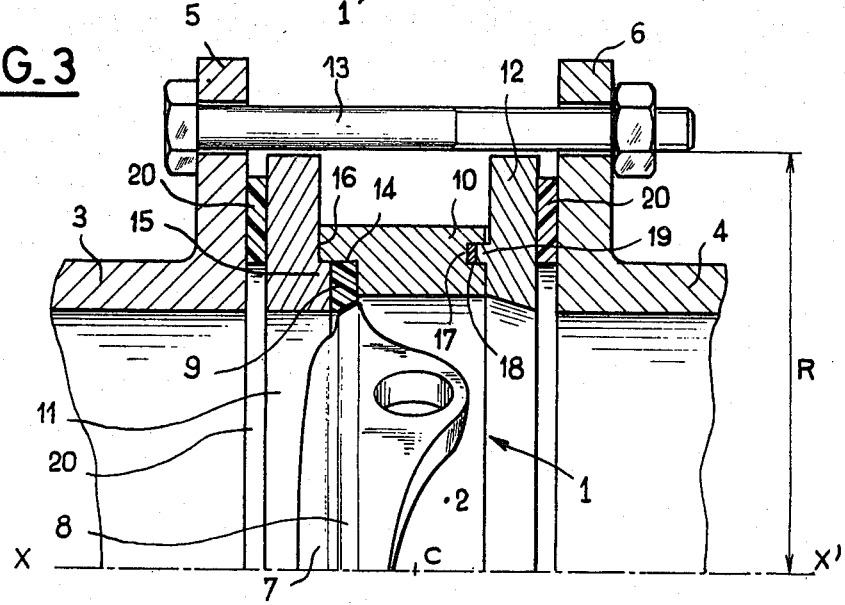
FIG_3

BUTTERFLY VALVE AND A METHOD OF MANUFACTURE OF SAID VALVE

This invention relates to a butterfly valve and to a method for the manufacture of said valve.

As is already known, a butterfly valve is constituted by a body, a passageway formed right through the valve body and intended to be placed opposite to two end portions of the piping system, and a butterfly closure element or valve disk rotatably mounted within the valve body. It is also a known practice to mount the butterfly valve disk laterally with respect to its axis of rotation which is transverse to the passageway. This valve disk is provided at its periphery with an annular bearing surface constituted by a spherical zone centered on the axis of rotation of said valve disk. The valve body is provided with an annular seat which projects within the passageway and is designed to receive the annular bearing surface of the butterfly disk in the closed position.

In the design contemplated by the invention, the butterfly valve itself is not provided with coupling flanges since the removable valve body is intended to be inserted between the coupling flanges of the two end portions of a piping system.

In order to provide a suitable bearing surface for applying the valve body against each pipe-coupling flange, the wall of said valve body is of substantial thickness, with the result that butterfly valves of this type are both heavy and costly to produce. This cost of construction is further increased by the need to make provision for a device which is usually of the screw-down type for holding the annular valve-seat in position.

In order to fabricate the body of a butterfly valve of known type, the initial step of the process consists in either molding or forging a starting element which is then machined so as to form the orifices, bearing surfaces, threaded portions or other precision surfaces which may be necessary.

This method of manufacture of known valves also entails high capital expenditure.

The aim of the present invention is to overcome these disadvantages by providing a butterfly valve which is of lightweight and economical design while ensuring the same performances as valves which have a conventional structure.

The invention is directed to a butterfly valve comprising a valve body traversed by a passageway which is intended to be placed in position opposite to two end portions of the piping system, and a closure element or butterfly valve disk rotatably mounted within the valve body and displaced laterally with respect to the axis of rotation thereof which is disposed transversely to said passageway. An annular bearing surface is provided at the periphery of said valve disk and intended to bear on a valve seat placed within the passageway. The valve body is constituted by an annular member provided with at least one necked extension or "chimney" which is located transversely with respect to the passageway and in which is mounted a shaft for rotational displacement of the valve disk.

According to the invention, said annular member is supported in leak-tight manner at least at one end by a bearing ring having a greater thickness in the radial direction than the wall of the annular member. Said bearing ring is intended to be inserted between the two end portions of the piping system and forms part of the valve body under operational conditions.

Thus the thickness of the valve body is not constant and the wall of the annular member may accordingly have a small thickness. As a consequence, the annular member can be of lightweight and economical construction. On the contrary, whereas the bearing ring is flattened along the axis of circulation of fluid within the valve, said ring can project outwards in the radial direction with respect to the annular member without affecting the lightness of weight of the valve and can thus constitute an excellent bearing member for the assembly of this latter.

The invention is also directed to a method of manufacture of the butterfly valve considered in the foregoing.

According to this aspect of the invention and particularly with a view to carrying out industrial manufacture of the valve body in large-scale production, the following steps are involved:

the use of a starting element consisting of a tubular structural shape provided with two diametrically opposite wings, the thickness of at least one of said wings being greater than the diameter of the shaft which serves to rotate the valve closure element or disk;

a segment having a thickness corresponding to the thickness of the central annular member of the valve body is cut from said structural shape;

two aligned bores are formed in the wings of said structural shape in order to accommodate respectively an operating shaft and a pivot for the butterfly disk.

This method of manufacture is particularly economical and dispenses with any need to form a blank of the central annular member by forging or molding.

Other features and advantages of the present invention will be more apparent on consideration of the following description and accompanying drawings which are given by way of example and not in any limiting sense, and in which:

FIG. 1 is a view of a valve according to the invention, said valve being inserted between two coupling flanges of two end portions of a piping system;

FIG. 3 is a half-view of the valve shown in FIGS. 1 and 2, this view being taken partly in cross-section on a plane parallel to the direction of flow and passing through the axis of one of the flange-clamping bolts, the shaft and pivot of the valve disk having been removed;

Figures 2, 4, 5, 8:
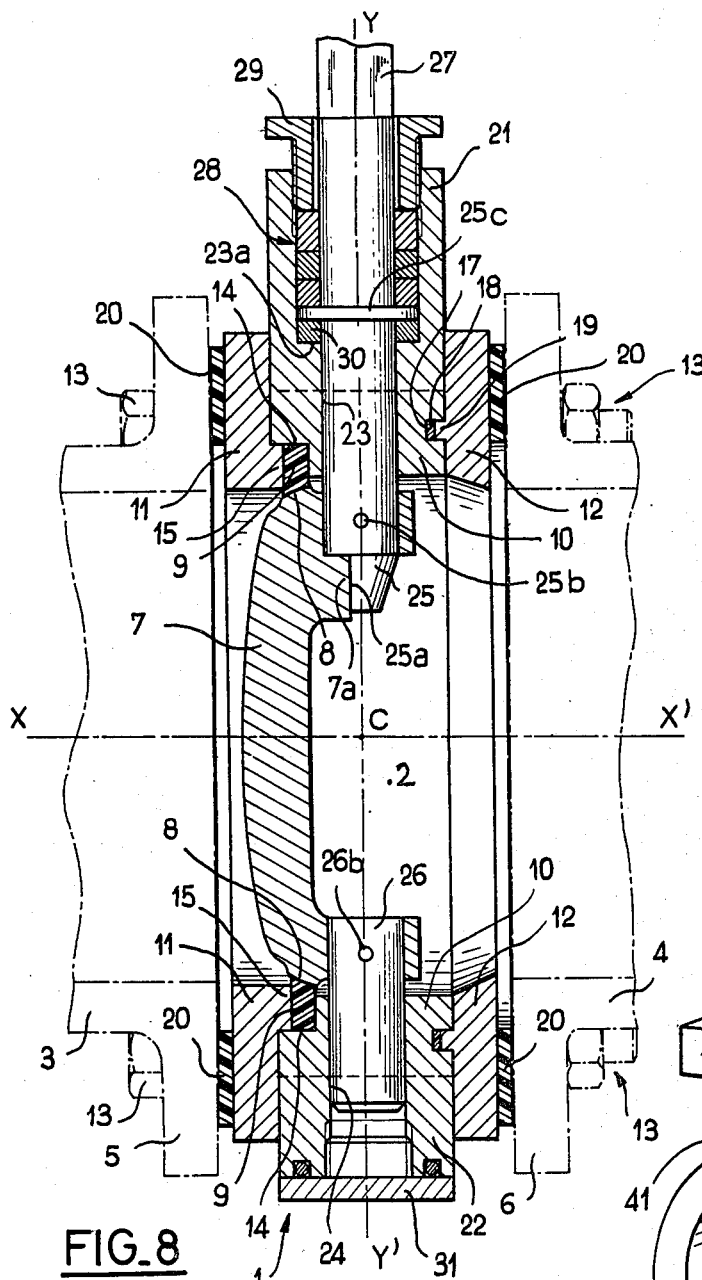
FIG. 2 is a view of the valve of FIG. 1, this view being taken in cross-section on a plane parallel to the direction of flow and passing through the axis of rotation of the valve closure element or valve disk.
FIG. 4 is a view of the structural shape used in the fabrication of the valve body.
FIG. 5 is a front view to a small scale showing an alternative form of construction of the valve.
FIG. 8 is a view of an alternative form of construction.

In the embodiment of FIGS. 1 to 3, the butterfly valve comprises a valve body 1 traversed by a passageway 2 (FIGS. 2 and 3) located opposite to two end portions 3, 4 of the piping system which are provided respectively with pipe-coupling flanges 5, 6.

Said valve further comprises a closure element or butterfly valve disk 7 rotatably mounted within the passageway 2 so as to turn on an axis Y–Y' and displaced laterally with respect to said axis which is located transversely with respect to the axis X–X' of the passageway 2.

Provision is made on the periphery of the valve disk 7 for an annular bearing surface 8 constituted by a spherical zone which is centered on the point C of intersection of the axes X–X' and Y–Y'. In the position of closure of the valve disk 7 (shown in FIGS. 2 and 3), the annular bearing surface 8 is intended to be applied against a valve seat 9 which is maintained in a projecting position within the passage 2 as will be explained in detail hereinafter.

The central portion of the valve body 1 is essentially constituted by an annular member 10 (as shown in particular in FIGS. 1 and 3).

According to the invention, the annular member 10 has a wall of relatively small thickness (FIG. 3) and is supported by two flattened bearing rings 11, 12 constituting the two end portions of the valve body 1 under service conditions.

The rings 11, 12 are clamped at the same time as the annular member 10 between the flanges 5 and 6 of the piping system by means of the bolts 13 which tend to bring these two flanges together and alone serve to apply said rings 11, 12 against the annular member 10.

The valve seat 9 is mounted within an annular recess 14 formed on one side of the annular member 10. The adjacent ring 11 is provided with an annular flange 15 in proximity to the ring opening which constitutes a portion of the passageway 2. Said annular flange 15 is inserted within the recess 14, thus ensuring accurate positioning of the annular member 10 with respect to the ring 11. Under service conditions, that portion of the ring 11 which does not include the annular flange 15 is applied against the non-recessed surface 16 of this side of the annular member 10 as shown in FIG. 3. The axial dimension of the annular flange 15 is such that, in the above-mentioned bearing position of the ring 11, the valve seat 9 is maintained in a favorable axial position and ensures leak-tight contact between the annular member 10 and said ring 11.

The valve seat 9 which is thus mounted between the annular member 10 and the ring 11 does not call for any special maintaining device and also dispenses with the need for an additional sealing system between the annular member 10 and said ring 11.

The annular member 10 is provided on the other side with an annular groove 17, the bottom portion of which is intended to accommodate a seal 18, an annular projection 19 of the ring 12 being adapted to engage within said groove. Said projection 19 ensures leak-tight compression of the seal 18 when the remaining portion of the ring 12 which is not engaged within the groove 17 bears on the end surface of the annular member 10.

Furthermore, the position of the annular member 10 with respect to the ring 12 is thus well-determined.

A flat seal 20 is placed between each ring 11, 12 and the adjacent coupling flange 5, 6.

The external diameter of the rings 11, 12 is greater than the diameter of the annular member 10 (as shown in FIGS. 1 and 3) and is close in value to the free distance R (FIG. 3) from each bolt 13 to the axis X–X' of the passageway 2.

Thus, centering of the valve on the passageway 2 is achieved as soon as the bolts 13 are in position around the valve.

The annular member 10 is provided with two "chimneys" 21, 22 (FIG. 2) which are located transversely with respect to the passageway 2 and in diametrically opposite relation. As shown in FIG. 2, bores 23, 24 respectively are formed within said chimneys and are coaxial with the axis Y–Y'. Said bores are traversed respectively by an operating shaft 25 and a pivot 26, both of which have preferably the same diameter and serve to displace the valve disk 7 in rotational motion about the axis Y–Y'.

The shaft 25 is mounted in a lug of the valve disk 7 and rotationally coupled to this latter by means of a flat surface 25a formed at one end of said shaft 25 and adapted to cooperate with a corresponding projecting portion 7a of the valve disk 7. Furthermore, said valve disk 7 is rigidly fixed on the shaft 25 to prevent translational displacement by means of a locking-pin 25b which passes through the aforementioned lug and the shaft 25.

The other end of the shaft 25 terminates in a square operating nut or flat portion 27 for securing the shaft 25 to an operating handle (not shown in the drawings).

The bore 23, the diameter of which is very close in value to the diameter of the shaft 25 in the proximity of the passageway 2, is enlarged at the outer end by means of an annular shoulder 23a for containing a packing-gland system 28. A gland nut 29 is engaged within the internally threaded end of the bore 23 which opens to the exterior of the valve.

The shaft 25 is adapted to carry an annular flange 25c, said flange being locked translationally between a washer 30 which is applied against the annular shoulder 23a and the gland seal of the packing-gland system 28, said gland seal being in turn applied against the annular flange 25c by the nut 29. The annular flange 25c ensures translational positioning of the shaft 25 within the bore 23 and cooperates with the locking-pin 25a in order to position the valve disk 7 within the passageway 2.

The chimney 21 terminates in two flanges or wings 32 (as shown in FIG. 1) which are disposed transversely with respect to the axes X–X' and Y–Y' and serve to fix a number of different devices such as, for example, stops and/or locking recesses arranged in spaced relation (but not shown in the drawings) for cooperating with the operating handle in order to define end positions or intermediate positions of opening of the valve.

The pivot 26 is engaged in a second lug of the valve disk 7 and rigidly coupled to said valve disk 7 to prevent relative translational displacement by means of a locking-in 26b which is passed through the ring and the pivot 26.

The bore 24 is closed by a leak-tight end cap 31.

A butterfly valve having the design characteristics described in the foregoing is of particularly lightweight construction. Substantial capital economy is also achieved by simple and effective centering as well as mounting of the valve seat by simple engagement.

In an alternative embodiment of the invention shown in FIG. 5, two screws 50 are passed through the ring 11 in proximity to its periphery and screwed respectively into the chimneys 21 and 22, preferably at the edges of these latter in order to prevent the screws 50 from penetrating into the bores 23, 24.

The ring 12 (not visible in FIG. 5) is fixed in the same manner on the other side of the chimneys 21, 22.

Cohesion of the valve prior to assembly is thus ensured and facilitates both handling and storage.

Figure 6:
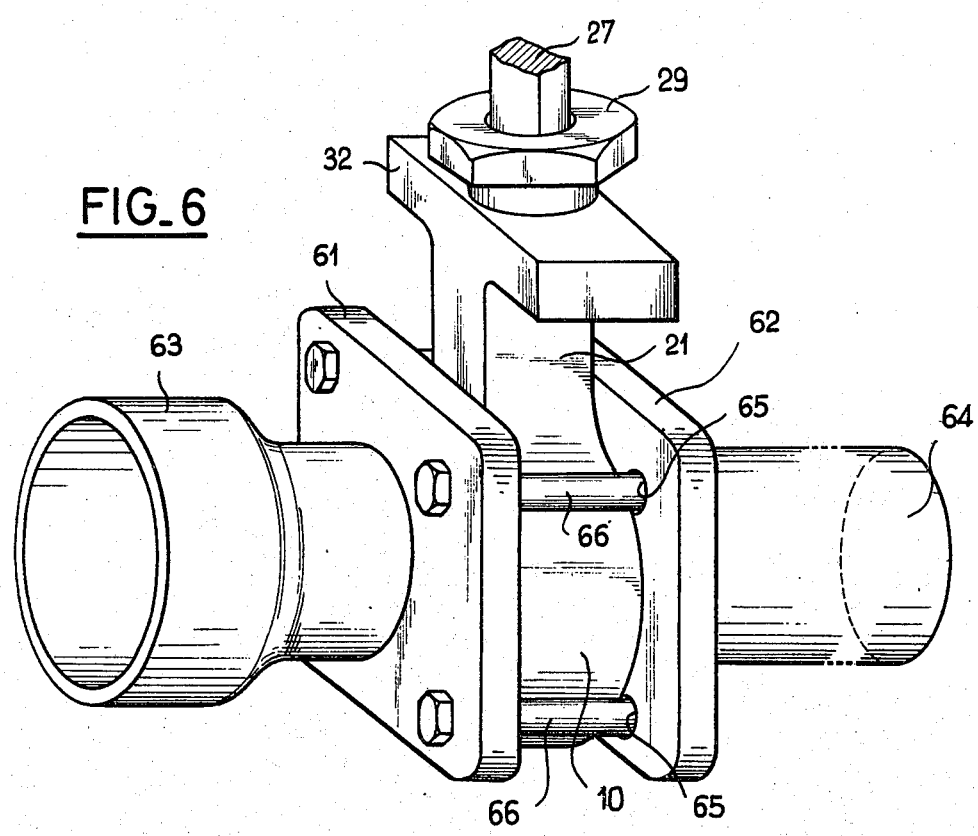
FIG. 6 is a view in perspective of another form of construction of a valve according to the invention.
Figure 7:
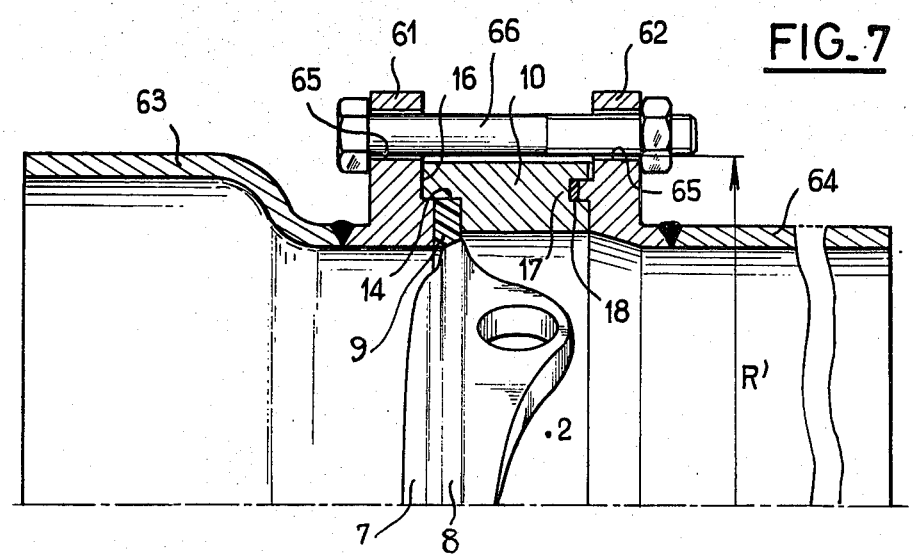
FIG. 7 is a view of the valve of FIG. 6, this view being taken in cross-section on a plane parallel to the direction of flow and passing through the axis of one of the flange bolts, the shaft and the pivot of the valve disk having been removed.

In another embodiment of the invention as shown in FIGS. 6 and 7, the rings 61, 62 are welded respectively to two tubular end-pieces 63, 64 of relatively substantial length which are in turn welded at the ends remote from the rings 61, 62 to the corresponding end portions of the piping systems.

In the example shown in the drawings, the outlet diameter of the end-piece 63 is larger than the diameter of the passageway 2 and of the end-piece 64, thus making it possible to mount the valve in the case of two sections of piping which have different diameters.

Four holes 65 are drilled in each of the rings 61, 62 and bolts 66 are engaged in said holes. The clamping action of the bolts tends to bring the rings 61, 62 together and to apply these latter against the annular member 10 in a leak-tight fit. The bearing and interengagement means proper are similar to those described with reference to FIGS. 1 to 3. The free distance R' between the stem of the bolt 66 and the axis X–X' is close in value to the external radius of the annular member 10.

The valve as thus constructed is particularly simple, lightweight and economical. After storage in a completely assembled state, the valve is inserted in a piping system and joined to this latter with a high degree of safety and reliability, simply by welding the end-pieces 63 and 64 to the pipe ends. By virtue of the length of the end-pieces 63, 64, welding operations are not liable to cause overheating of valve seats or seals which are in any case very limited both in number and weight.

In order to carry out a repair such as, for example, the replacement of the valve seat 9, the bolts 66 can accordingly be removed without opening the welded joint between the end-pieces 63, 64 and the piping system.

The valve in accordance with the invention can be constructed by means of a wide range of different methods.

Within the scope of the invention, preference is nevertheless given to the following method which is primarily directed to manufacture of the annular member 10.

This method entails the use of a starting element consisting of an extruded structural shape 40 of tubular design (as shown in FIG. 4) which is provided with two diametrically opposite wings. The width of the wing 41 exceeds the diameter of the bore 23 as measured at the level of the packaging gland 28 whilst the width of the wing 42 exceeds the diameter of the pivot 26. Furthermore, the wing 41 of the structural shape terminates in two flanges 43 which extend in opposite directions at right angles to the wing 41.

A segment 40a (shown in dashed outline in FIG. 4) is cut from said structural shape 40 and has the desired thickness of the annular member 10 so as to constitute the blank of said member.

The next operation to be performed on said segment consists in machining bores 23 and 24 respectively in the wing segments 41 and 42 which constitute the chimneys 21 and 22, and also in machining the recess 14 and the groove 17.

The opening of each bore 23, 24 is provided with an internal screw-thread in order to mount the nut 29 and the end cap 31.

The method involving extrusion of a structural shape is particularly economical for large-scale production and therefore adds to the advantages of capital economy which are attached to the constructional design of the valve.

As can readily be understood, the invention is not limited to the examples hereinabove described and many arrangements or improvements can be made in these examples without thereby departing either from the scope or the spirit of the invention.

From this it accordingly follows that the rings can be formed in one piece with the central annular member or that only one ring is removable in order to permit maintenance of the valve seat as explained earlier.

Moreover, the bolts 13 can be replaced by tie-rods having a threaded portion at both ends which are each associated with a clamping nut.

In order to facilitate positioning of the seal 20, provision can also be made on that face of each ring 11, 12 which is directed towards the coupling flanges 5, 6 for an annular projection and/or recess or alternatively for projecting portions of small size which are disposed at intervals on a circle corresponding to the external or internal diameter of the seal 20.

Some of the improvements proposed in French patent No 79 09 033 in the name of the present Applicant can also be adapted to the valve according to the invention. A particular result thereby achieved is shown in the fragmentary view of FIG. 8, this view being taken in cross-section on a plane which passes through the axis of flow X–X'. That surface 70 of the lugs of the valve disk 71 which is directed towards the wall of the passageway 2 can be spherical and form part of the same sphere which is centered at C as the bearing surface 8 of the valve disk 71. Furthermore, the valve disk 71 can be rigidly fixed to the operating shaft 72 (partially cut away in the lug as shown in the figure) by means of internal splines 73 formed in the internal surface of the lug orifice in which the shaft 72 is engaged, and by means of corresponding external splines 74 formed on the opposite surface of the shaft 72.

By virtue of this arrangement, the advantages of high precision which are obtained in the case of the valve body according to the invention are combined with the enhanced degree of precision achieved by the structure disclosed in French patent Application No 79 09 033.

What is claimed is:

1. A butterfly valve comprising a valve body traversed by a passageway which is adapted to be disposed between two end portions of a piping system, and a butterfly valve disk rotatably mounted within the valve body and displaced laterally with respect to the axis of rotation thereof which is disposed transversely to said passageway, an annular bearing surface at the periphery of said valve disk and adapted to bear on a valve seat within the passageway, the valve body comprising an annular member having two opposite chimneys which are directed transversely to said passageway and in which shaft means are mounted for rotational displacement of the valve disk, the annular member being mounted between first and second bearing rings which are radially thicker than the wall of the annular member in regions apart from the chimneys, the valve seat being located in a recess in one annular end of the annular member and being disposed between one face of said recess and a flange projecting from said first bearing ring and fitting into said recess, sealing means disposed between the second bearing ring and the annular member, each of said bearing rings having an external radius which is larger than that of the annular member apart from the chimneys, mutual centering means coupling the annular bearing member and said second bearing ring, and means for centering said annular member and both bearing rings with respect to the piping system.

2. A butterfly valve according to claim 1, in which the seat is inserted in a leak-tight manner between said face of the recess and said flange.

3. A butterfly valve according to claim 1, wherein the valve body is adapted to be inserted between two flanges each constituting one end of the piping system, and wherein both bearing rings have substantially the same external radius which is greater than that of the annular member and close in value to the free distance between the axis of the passageway and the stem of each of a series of bolts that urge the flanges toward each other.

4. A butterfly valve according to claim 1, wherein the bearing ring and the thicker part are each secured to a respective tubular end piece adapted to permit welding of the valve to both end portions of the piping system after assembly of the valve seat between the annular member and the bearing rings.

5. A butterfly valve according to claim 4, comprising bolts urging the bearing ring toward the thicker part, the free distance between each of these bolts and the axis of the passageway being close to the external radius of the annular member.

6. A method of manufacturing a butterfly valve body comprising the following steps:

manufacturing an elongated tubular profiled element while providing it with two diametrically opposed wings;

cutting a slice from the tubular profiled element in a plane perpendicular to the length of the tubular element;

forming two aligned bores in the wings of said slice of said tubular element in order to accommodate respectively an operation shaft and a pivot for a butterfly disk;

forming a valve seat recess at one annular end of the slice;

forming an annular groove at the other annular end of said slice;

providing a first bearing ring with a flange adapted to be fitted in the recess of the annular member;

providing a second bearing ring with an annular projection adapted to be fitted in the annular groove of the annular member;

inserting a valve seat in the recess of the annular member and a seal in the groove of the annular member, and mounting the annular member between the two bearing rings.

7. A method according to claim 6, in which said elongated tubular profiled element has a uniform cross section throughout its length.

8. A method according to claim 7, in which said elongated tubular profiled element is manufactured by extrusion.

* * * * *